(12) United States Patent
Huhn (10) Patent No.: US 8,827,374 B2
(45) Date of Patent: Sep. 9, 2014

(54) FOLDING CANOPY FOR COLD PLANER MACHINE

(75) Inventor: Derek K. Huhn, Monticello, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 108 days.

(21) Appl. No.: 13/562,903

(22) Filed: Jul. 31, 2012

(65) Prior Publication Data

US 2014/0035344 A1 Feb. 6, 2014

(51) Int. Cl.
    *E01C 23/088* (2006.01)

(52) U.S. Cl.
    CPC .......... *E01C 23/088* (2013.01); *E01C 2301/30* (2013.01)
    USPC ........................................ 299/39.2; 299/39.4

(58) Field of Classification Search
    CPC .......... B62D 33/0617; B62D 33/0621; B62D 33/067; E01C 2301/30; E02F 9/166
    USPC ......... 299/36.1, 39.1, 39.2, 39.4; 296/107.16, 296/107.17, 190.1
    See application file for complete search history.

(56) References Cited

U.S. PATENT DOCUMENTS

| | | | | |
|---|---|---|---|---|
| D184,043 S | * | 12/1958 | Dodge | D15/30 |
| 3,472,550 A | * | 10/1969 | Marco | 296/102 |
| 3,917,310 A | * | 11/1975 | Mitsuishi | 280/756 |
| 4,275,800 A | * | 6/1981 | Batzel | 180/317 |
| 4,966,418 A | * | 10/1990 | Wirtgen | 299/39.2 |
| 5,842,732 A | | 12/1998 | Daggett et al. | |
| 7,152,903 B2 | | 12/2006 | Westendorf et al. | |
| 7,380,626 B2 | | 6/2008 | Chikaishi et al. | |
| 8,292,355 B2 | * | 10/2012 | Miller | 296/201 |
| 8,622,480 B2 | * | 1/2014 | Weckerly et al. | 299/39.2 |
| 2011/0121633 A1 | * | 5/2011 | Hall et al. | 299/39.2 |

FOREIGN PATENT DOCUMENTS

| | | | |
|---|---|---|---|
| EP | 0810324 A1 | | 2/1997 |
| EP | 2166154 A2 | * | 3/2010 |
| JP | 04-043123 | * | 2/1992 |
| JP | 05-124437 | * | 5/1993 |
| JP | 11-140816 A | | 5/1999 |

* cited by examiner

*Primary Examiner* — David Bagnell
*Assistant Examiner* — Michael Goodwin
(74) *Attorney, Agent, or Firm* — Leydig, Voit & Mayer (57) ABSTRACT

A machine for milling a surface of a roadway is provided. The machine includes a frame and an operator station arranged on the frame. A canopy assembly including a canopy and a support assembly is provided. The support assembly supports the canopy on a portion of the frame forward of the operator station such that canopy is movable between a raised position and a lowered position. The canopy and the support assembly are configured such that in the raised position the canopy extends over at least a portion of the operator station and in the lowered position the canopy is arranged in a substantially flat orientation relative to and adjacent an upper surface of a portion of the frame forward of the operator station.

20 Claims, 5 Drawing Sheets

FOLDING CANOPY FOR COLD PLANER MACHINE

TECHNICAL FIELD

This patent disclosure relates generally to cold planer machines for milling the surface of roadways and, more particularly to a canopy for a cold planer.

BACKGROUND

Cold planer machines are machines that are configured to mill, for example in order to remove, mix or reclaim, material from the surface of a roadway. To this end, cold planer machines include a rotatable planing tool that is supported on a frame and can be brought into contact with the surface of a roadway. An operator generally directs the functioning of the cold planing machine from an operator station that includes various controls for the machine. The operator station is generally arranged on the top of the machine frame.

Many cold planer machines include a canopy that extends over the operator station of the machine to help shield the operator of the machine and the controls in the operator station from the environment including sunlight and precipitation. However, under certain operating conditions, the canopy can inhibit the maneuverability of the cold planer machine. In particular, during operation a cold planer may experience certain aerial obstacles such as hanging tree branches and power lines that can obstruct movement of the cold planer by coming into contact with the canopy. Accordingly, many cold planers have canopies that can be moved or lowered out of the way in order to clear such obstacles. While lowering the canopy may permit the cold planer machine to avoid the aerial obstacle, conventional canopy arrangements for cold planer machines have legs that pass through the operator station and obstruct the operator's access to the machine controls when the canopy is in the lowered position. As a result, the cold planer machine can be more difficult to operate when the canopy is in the lowered position.

EP 2 166 154A2 discloses a pivoting roof for a construction machine. The roof is supported by pivotable front and rear frame parts that permit the roof to be lowered into a transport position. In the transport position, the rear frame parts extend into the operator station and the roof is spaced above the front portion of the machine frame and still partially over the operator station. With the roof in this position, an operator would not be able to operate the machine.

SUMMARY

The disclosure describes in one aspect, a machine for milling a surface of a roadway that includes a frame and an operator station arranged on the frame. A loading conveyor is arranged at a front end of the frame with the loading conveyor defining a forward direction relative to the operator station. A canopy assembly including a canopy and a support assembly is provided. The support assembly supports the canopy on a portion of the frame forward of the operator station such that canopy is movable between a raised position and a lowered position. The canopy and the support assembly are configured such that in the raised position the canopy extends over at least a portion of the operator station and in the lowered position the canopy is arranged in a substantially flat orientation relative to and adjacent an upper surface of a portion of the frame forward of the operator station.

The disclosure describes in another aspect a machine for milling a surface of a roadway that includes a frame and an operator station arranged on the frame. The operator station includes an operator input device arranged to be operated by an operator facing a forward direction relative to the frame. A canopy assembly including a canopy and a support assembly is provided. The support assembly supports the canopy on a portion of the frame forward of the operator station such that canopy is movable between a raised position and a lowered position. The canopy and the support assembly are configured such that in the raised position the canopy extends over at least a portion of the operator station and in the lowered position the canopy is arranged in a substantially flat orientation relative to and adjacent an upper surface of a portion of the frame forward of the operator station.

The disclosure describes in another aspect a machine for milling a surface of a roadway including a frame. An operator station is arranged on the frame and includes a seat facing a forward direction relative to the frame. A canopy assembly is provided that includes a canopy and a support assembly. The support assembly includes a parallel four bar linkage supporting the canopy on the frame forward of the operator station such that canopy is movable between a raised position and a lowered position. The support assembly also includes an actuator for moving the canopy between the raised and lowered positions. The canopy and the support assembly are arranged and configured such that in the raised position the canopy extends over at least a portion of the operator station and such that in the lowered position the canopy is arranged in a substantially flat orientation relative to and adjacent an upper surface of a portion of the frame forward of the operator station.

DETAILED DESCRIPTION

Figure 1:
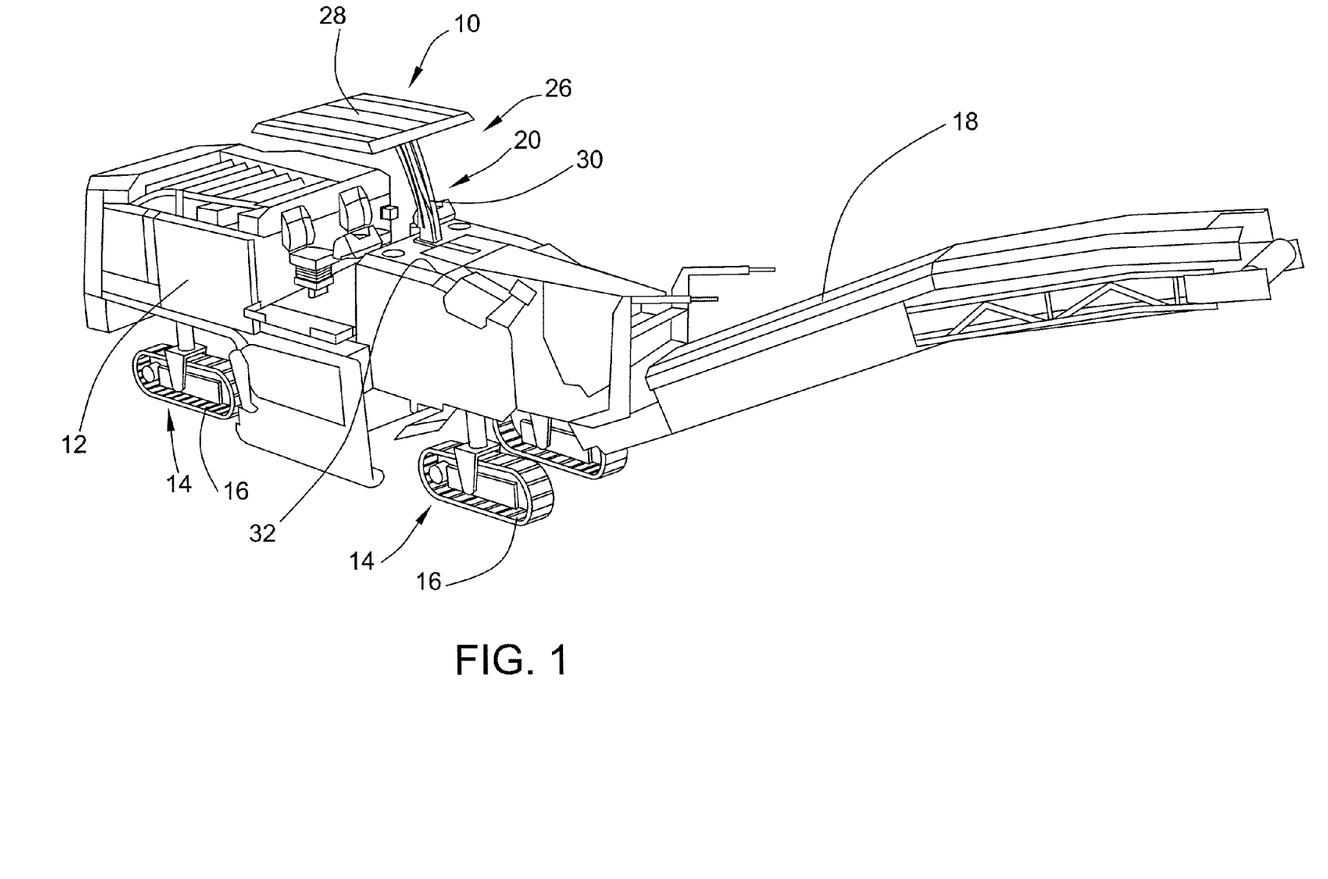
FIG. 1 is a perspective view of an exemplary cold planer machine with a canopy assembly according to the present disclosure in the raised position.

This disclosure relates to an assembly for providing an operator of a road milling machine some protection from the environment that can be repositioned when necessary to avoid aerial obstacles. With particular reference to FIG. 1 of the drawings, an exemplary road milling machine, also known as a cold planer machine 10, is shown. In a known manner, the illustrated cold planer machine 10 can be used to remove, mix or reclaim material from the surface of a roadway or other surfaces.

The cold planer machine 10 illustrated in FIG. 1 includes a frame 12 that is supported on front and rear suspension assemblies 14 that include traction devices 16 that can help transport the cold planer machine 10 across a work surface. In this case, the traction devices 16 include tracks, although other traction devices suitable for use on mobile work machines, including for example wheels, could also be used.

At least one of the traction devices 16 may be powered for example by a drive assembly (not shown) for propelling forward and rearward movement of the cold planer machine 10. The drive assembly may be powered, for example, by an internal combustion engine or a hydraulic motor.

For milling the surface of the roadway, the cold planer machine 10 can include a rotatable planing tool such as, for example, a rotatable drum or cylinder. The planing tool may include a plurality or replaceable bits mounted thereon that may be brought into engagement with a roadway surface. Upon engagement, the bits may cut and remove material from a roadway surface. In order to adjust the amount of material removed from a roadway, the planing tool may be vertically adjustable relative to the roadway surface so as to alter the depth of cut made into the roadway surface. After being cut by the planing tool, the removed material may enter a loading conveyor 18 (see FIG. 1) which can be used to transfer the removed material into a dump truck or other suitable machine for transport off site. In the illustrated embodiment, the loading conveyor 18 is supported on a forward end of the frame 12 of the cold planer machine 10. In a known manner, the loading conveyor 18 may be hinged so that the conveyor can be folded to facilitate transport and storage of the cold planer machine.

Figure 3:
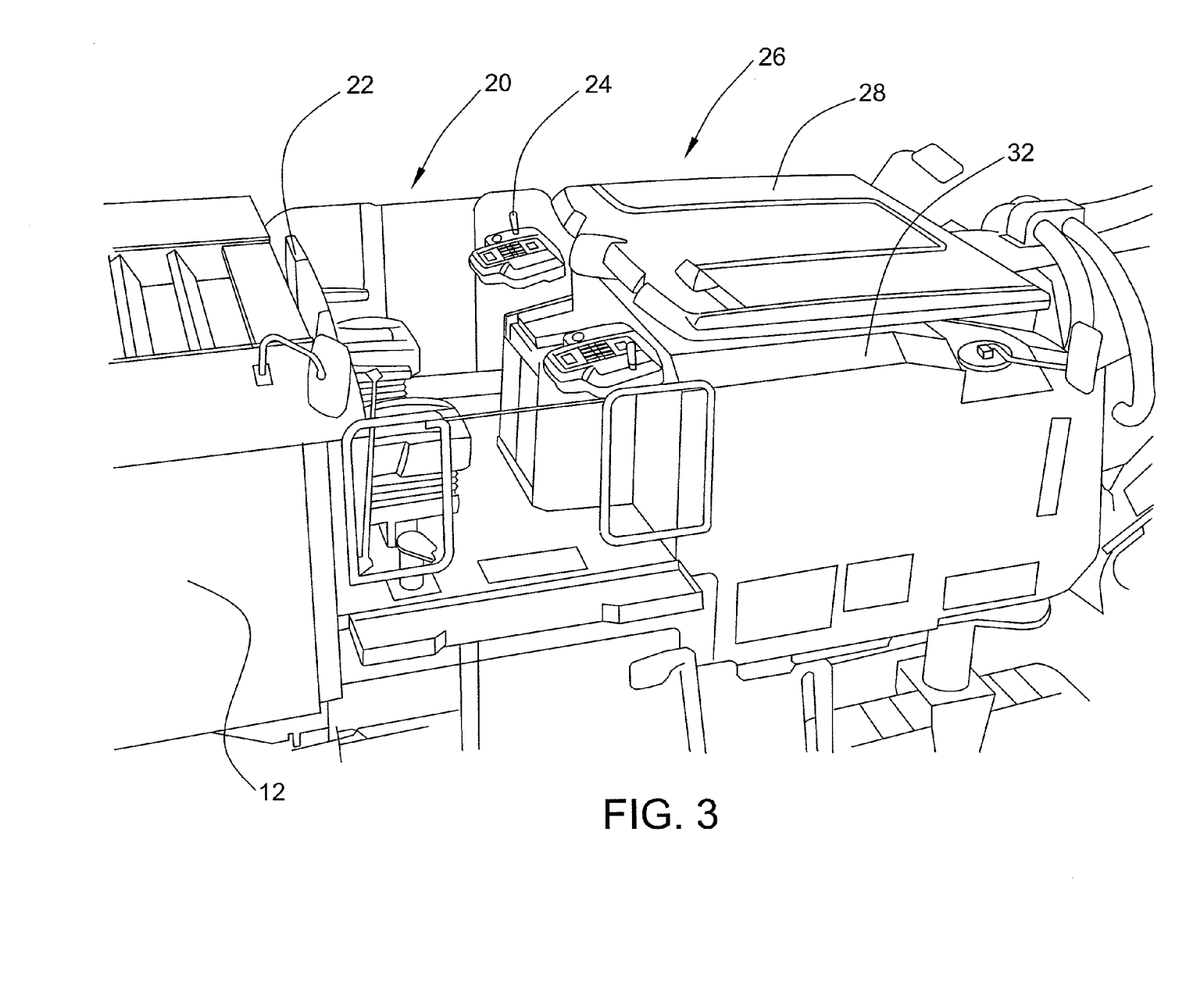
FIG. 3 is a partial perspective view of the cold planer machine of FIG. 1 showing the canopy assembly in the lowered position.

For accommodating an operator of the cold planer machine 10, an operator station 20 may be arranged on an upper side of the frame 12. The operator station 20 may include a seat 22 (in this case two seats) for the operator that face towards the forward end of the frame 12. However, the inclusion of seats 22 is optional and the operator station 20 may alternatively be configured without any seats. The operator station 20 may also include an operator input device 24 (see FIG. 3) for controlling one or more functions of the machine 10. The operator input device 24 may embody any one of numerous devices that control functions of the machine. In one example, and as shown in FIG. 3, the operator input device 24 may embody a joystick controller. It is contemplated, however, that operator input device 24 may embody additional or different control devices such as, for example, pedals, levers, switches, buttons, wheels, and other control devices known in the art. The operator input device 24 may be located, for example, in close proximity to the operator's seat 22 as shown in FIG. 3. The operator input device 24 also may be arranged, for example in a forward portion of the operator station 20, and oriented so as to be readily manipulated by an operator facing the forward end of the frame 12.

To help protect the operator from the environment, the cold planer machine 10 may be equipped with a canopy assembly 26. The canopy assembly may include a canopy 28 and a support assembly 30, which in this case supports the canopy 28 on an upper surface of a portion 32 of the frame 12 forward of the operator station 20. With many cold planer machines, the portion of the frame forward of the operator station comprises a water tank. The canopy 28 may have a generally flat configuration opening that defines a solid barrier for helping block certain environmental effects including, for example, sun, rain and snow.

Figure 2:
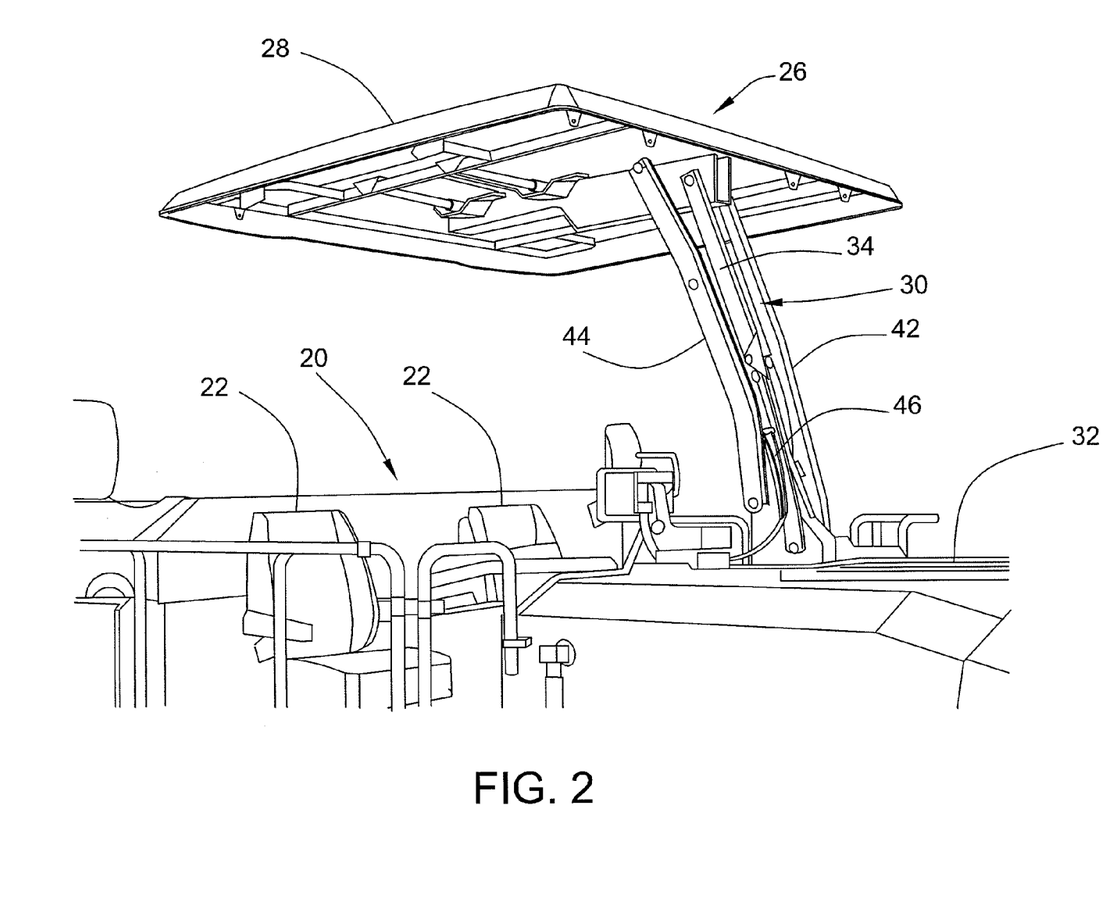
FIG. 2 is a partial perspective view of the cold planer of FIG. 1 showing the canopy assembly in the raised position.

To allow the canopy 28 to be lowered in order to avoid aerial obstacles, such as tree branches and overhead wires, that may be encountered during operation of the cold planer machine 10, the support assembly 30 may further be configured such that the canopy 28 is movable between raised and lowered positions. As shown in FIGS. 1 and 2, in the raised position, the canopy 28 extends over the top of at least a portion of the operator station 20 so as to shield an operator of the machine. As shown in FIG. 3, in the lowered position, the canopy 28 is arranged in a substantially flat orientation relative to and adjacent the upper surface of the portion 32 of the frame 12 forward of the operator station 20. In this position, the canopy 28 is totally outside of the operator station 20 and thus does not impede the operator from accessing any of the controls therein. Moreover, the canopy 28 is arranged in a position that permits the operator to still have good visibility.

One example of a suitable support assembly 30 for the canopy 28 is a parallel four bar linkage 34 such as best shown in FIG. 2. In this case, a first end of the four bar linkage 34 is connected to the underside of the canopy 28 via a mounting flange 38 and an opposing second end of the linkage is connected to the frame 12 via a bracket 40. The illustrated four bar linkage 34 includes two parallel forward legs 42 and two parallel rearward legs 44 with each leg being pivotally connected at its upper end to the canopy mounting flange 38 and its lower end to the mounting bracket 40 on the frame 12. In each case, the pivotal connection may be implemented by pins and bushings. Other types of linkage or leg arrangements may also be used to support and allow movement of the canopy 28 between the raised and lowered positions.

To move the canopy 28 between the raised and lowered position, the support assembly 30 may further include an actuator 46, for example a hydraulic actuator. In the illustrated embodiment, the actuator 46 is arranged between the left and right side links of the four bar linkage 34 as shown in FIG. 2 and connected to the four bar linkage 34 such that extension and refraction of the actuator 46 drives the four bar linkage so as to raise and lower the canopy 28. Other type of actuators could be used or alternatively the canopy may be raised and lowered manually.

The support assembly 30 including the four bar linkage 34 and actuator 46 may be arranged and configured such that when the canopy 28 is in the lowered position the entire four bar linkage and the actuator are arranged forward of the operator station and underneath the canopy (see FIG. 3). In this way, the four bar linkage 34 and actuator 46 do not impede the operator's access to the controls in the operator station 20 or visibility when the canopy 28 is in the lowered position. As a result of the positions of the canopy 28, four bar linkage 34 and actuator 46, an operator may operate the cold planer machine normally even with the canopy lowered to, for example, avoid an aerial obstacle.

Figure 4:
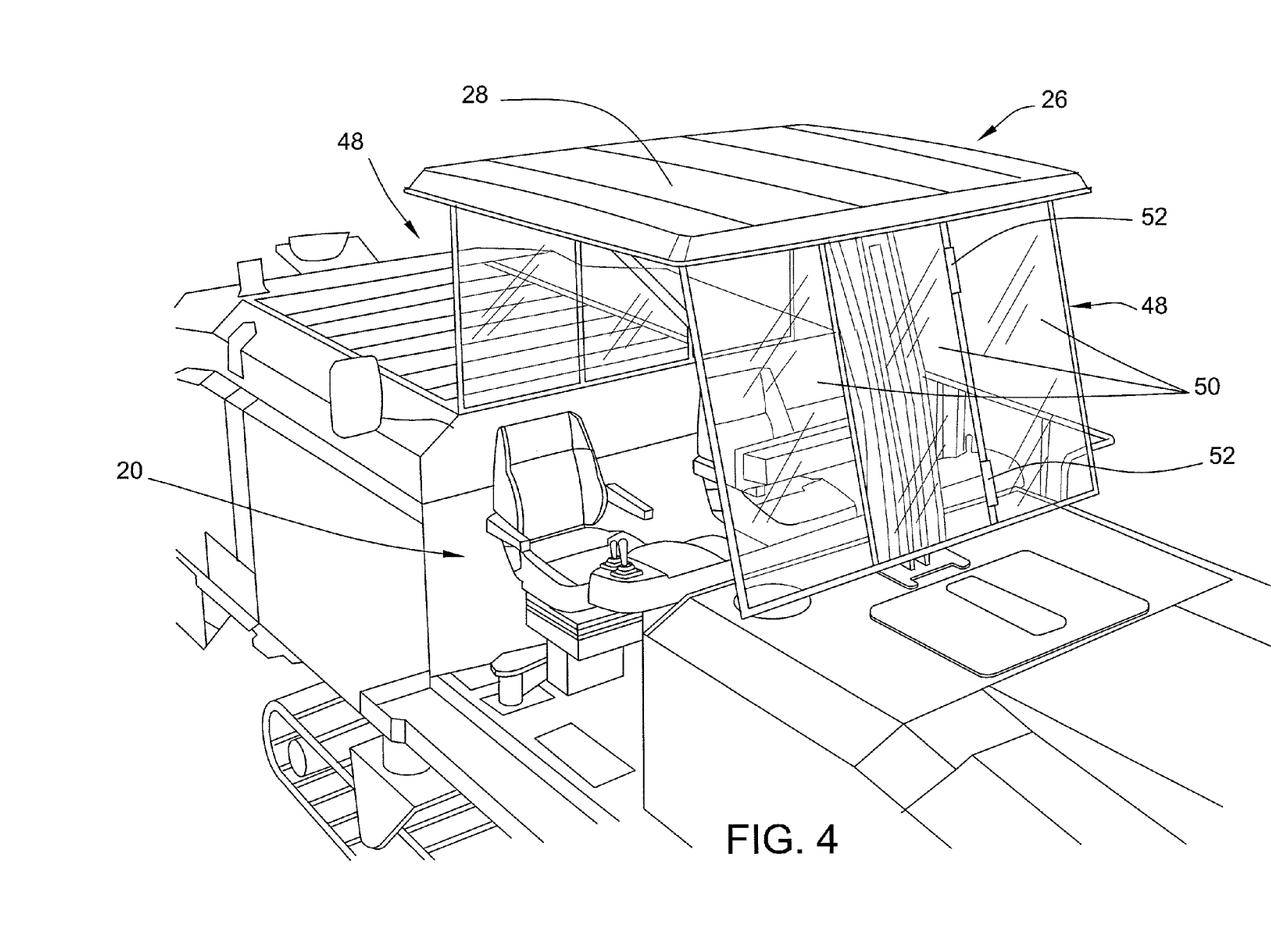
FIG. 4 is a partial perspective view of an illustrative cold planer machine with a further embodiment of a canopy assembly according to the present disclosure that includes windows.
Figure 5:
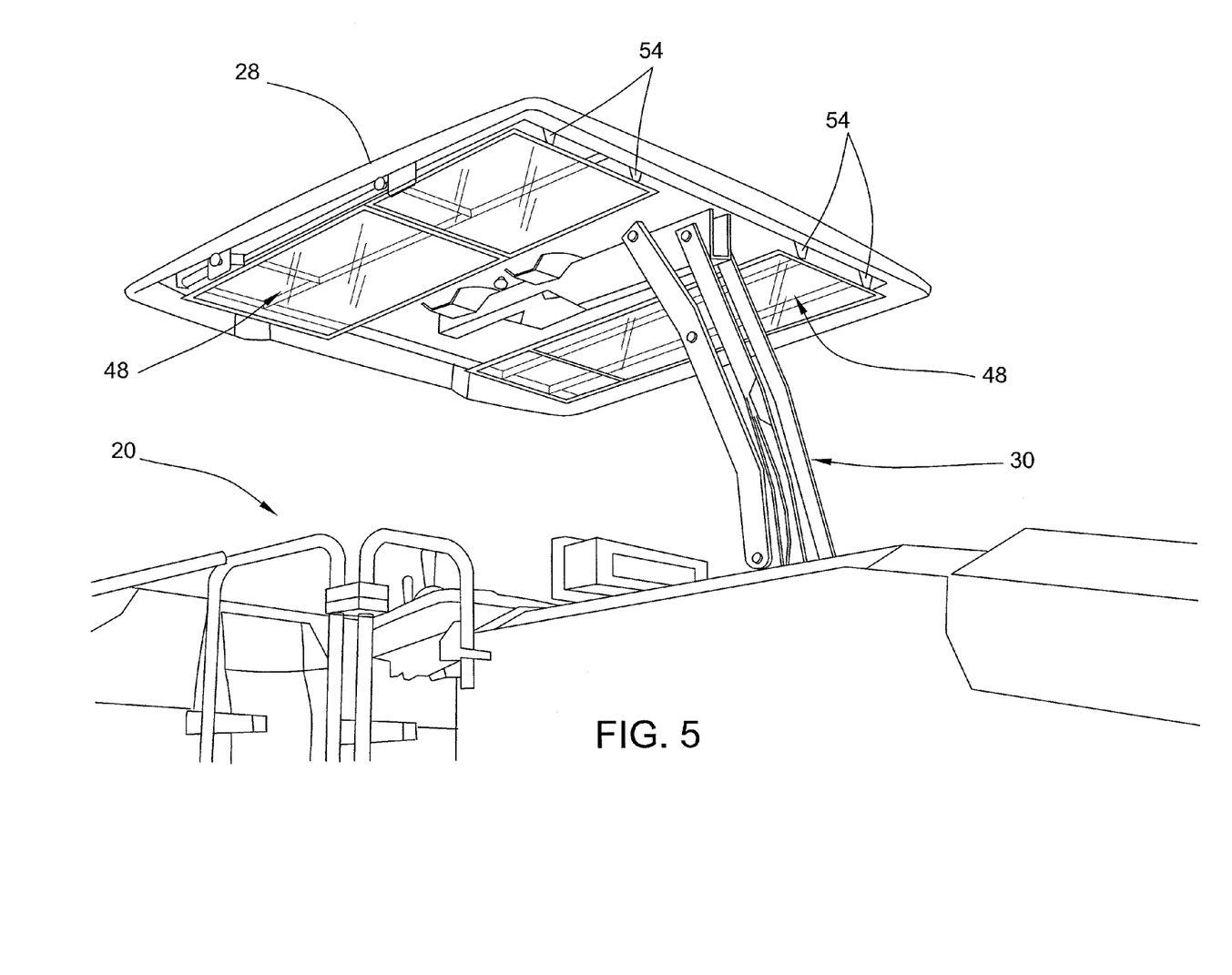
FIG. 5 is a partial perspective view of the cold planer machine and canopy assembly of FIG. 4 showing the windows in a stowed position underneath the canopy.

Another embodiment of a canopy assembly 26 according to the present disclosure is shown in FIGS. 4 and 5. In this embodiment, the canopy assembly 26 may optionally be provided with one or more windows 48. The canopy assembly 26 may otherwise be configured the same or similarly as in the embodiment shown in FIGS. 1-3. The windows 48 may be provided at both the front and rear of the operator station 20. In order to allow the windows 48 to be lowered with the canopy 28, the windows 48 may be configured to be manually folded into a stowed position before the canopy 28 is lowered. To this end, the windows 48 can be divided into a plurality of panes 50. In this case, both rear and front windows 48 have three panes 50 with the middle pane being connected via hinges 52 to one of the side panes and both the side panes being supported via a pivoting connection 54 (see FIG. 5) to the underside of the canopy 28. With this arrangement, prior to lowering the canopy 28, the middle pane can be folded over the side pane to which it is hinged and then the side panes (including the middle panes) can then be folded up and stowed on the underside of the canopy 28 as shown in FIG. 5.

Once the window panes 48 are stowed, the canopy 28 can be moved to the lowered position. Since the panes 50 are connected to the canopy 28, they will move with the canopy 28 to the lowered position. Moreover, because the windows 48 can be stowed underneath the canopy, the canopy 28 can still be lowered into a position where canopy is arranged in a substantially flat orientation relative to and adjacent an upper surface of a portion of the frame forward of the operator station 20. As will be appreciated, the windows can be supported and configured in in any suitable manner that would prevent them from interfering with movement of the canopy into the lowered position. For example, windows that roll-up or otherwise are retractable into the canopy could be used as opposed to windows that fold-up.

Industrial Applicability

The present disclosure may be applicable to road milling machines of any configuration that include a canopy over the operator station. The disclosed canopy assembly 26 may be particularly suitable to larger cold planer machines that may be used in applications in which the canopy is likely to come into contact with aerial obstacles such as tree branches and overhead utility lines. As compared to canopy assemblies that extend into the operator station when in the lowered position, the disclosed canopy assembly 26 can provide an operator with unimpeded access to the controls in the operator station as well as good visibility when the canopy is lowered. As a result, the cold planer machine can be operated in normal manner both when the canopy is raised and when it is lowered.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A machine for milling a surface of a roadway comprising:
   a frame;
   an operator station arranged on the frame for accommodating an operator of the machine, the operator station including an operator input device for controlling at least one function of the machine;
   a loading conveyor arranged at a front end of the frame, the loading conveyor defining a forward direction relative to the operator station;
   a canopy assembly including a canopy and a support assembly, the support assembly supporting the canopy on the frame forward of the operator station such that the canopy is movable between a raised position and a lowered position, the canopy and the support assembly being arranged and configured such that in the raised position the canopy extends over at least a portion of the operator station and such that in the lowered position the canopy is arranged in a substantially flat orientation relative to and adjacent an upper surface of a portion of the frame forward of the operator station with no portion of the canopy extending into or over the operator station.

2. The machine of claim 1 wherein the support assembly comprises a parallel four bar linkage.

3. The machine of claim 2 wherein the parallel four bar linkage is pivotally connected at a first end to the frame and at an opposing second end to the canopy.

4. The machine of claim 2 wherein the parallel four bar linkage is arranged forward of the operator station when the canopy is in the lowered position.

5. The machine of claim 2 wherein the parallel four bar linkage is arranged underneath the canopy when the canopy is in the lowered position.

6. The machine of claim 2 further including windows supported on the canopy and configured so as to be movable into a stowed position underneath the canopy.

7. The machine of claim 1 wherein the support assembly includes an actuator for moving the canopy between the raised position and the lowered position.

8. The machine of claim 7 wherein the actuator is arranged underneath the canopy when the canopy is in the lowered position.

9. A machine for milling a surface of a roadway comprising:
   a frame;
   an operator station arranged on the frame for accommodating an operator of the machine and including an operator input device arranged to be operated by an operator facing a forward direction relative to the frame;
   a canopy assembly including a canopy and a support assembly, the support assembly supporting the canopy on a portion of the frame forward of the operator station such that the canopy is movable between a raised position and a lowered position, the canopy and the support assembly being configured such that in the raised position the canopy extends over at least a portion of the operator station and in the lowered position the canopy is arranged in a substantially flat orientation relative to and adjacent an upper surface of a portion of the frame forward of the operator station with no portion of the canopy extending into or over the operator station.

10. The machine of claim 9 wherein the support assembly comprises a parallel four bar linkage.

11. The machine of claim 10 wherein the parallel four bar linkage is pivotally connected at a first end to the frame and at an opposing second end to the canopy.

12. The machine of claim 10 wherein the parallel four bar linkage is arranged forward of the operator station when the canopy is in the lowered position.

13. The machine of claim 10 wherein the parallel four bar linkage is arranged underneath the canopy when the canopy is in the lowered position.

14. The machine of claim 9 wherein the support assembly includes an actuator for moving the canopy between the raised position and the lowered position.

15. The machine of claim 14 wherein the actuator is arranged underneath the canopy when the canopy is in the lowered position.

16. The machine of claim 9 further including windows supported on the canopy and configured so as to be movable into a stowed position underneath the canopy.

17. A machine for milling a surface of a roadway comprising:
- a frame;
- an operator station arranged on the frame for accommodating an operator and including an operator input device arranged to be operated by an operator facing a forward direction relative to the frame;
- a canopy assembly including a canopy and a support assembly, the support assembly comprising a parallel four bar linkage supporting the canopy on the frame forward of the operator station such that the canopy is movable between a raised position and a lowered position and an actuator for moving the canopy between the raised position and the lowered position, the canopy and the support assembly being arranged and configured such that in the raised position the canopy extends over at least a portion of the operator station and such that in the lowered position the canopy is arranged in a substantially flat orientation relative to and adjacent an upper surface of a portion of the frame forward of the operator station with no portion of the canopy extending into or over the operator station.

18. The machine of claim 17 wherein the support assembly is arranged forward of the operator station when the canopy is in the lowered position.

19. The machine of claim 17 wherein the support assembly is arranged underneath the canopy when the canopy is in the lowered position.

20. The machine of claim 17 further including windows supported on the canopy and configured so as to be movable into a stowed position underneath the canopy.

* * * * *

UNITED STATES PATENT AND TRADEMARK OFFICE
CERTIFICATE OF CORRECTION

| | | |
|---|---|---|
| PATENT NO. | : 8,827,374 B2 | Page 1 of 1 |
| APPLICATION NO. | : 13/562903 | |
| DATED | : September 9, 2014 | |
| INVENTOR(S) | : Derek K. Huhn | |

It is certified that error appears in the above-identified patent and that said Letters Patent is hereby corrected as shown below:

In the Specification,

Column 4, line 26, delete "refraction" and insert -- retraction --.

Column 5, line 9, delete "Industrial Applicability" and insert -- INDUSTRIAL APPLICABILITY --.

Signed and Sealed this
Fifteenth Day of September, 2015

Michelle K. Lee
*Director of the United States Patent and Trademark Office*